US005251051A

United States Patent [19]

Fujiyoshi et al.

[11] Patent Number: 5,251,051

[45] Date of Patent: Oct. 5, 1993

[54] CIRCUIT FOR DRIVING LIQUID CRYSTAL PANEL

[75] Inventors: Tatsumi Fujiyoshi, Sendai; Munemitsu Abe, Miyagi, both of Japan

[73] Assignee: Alps Electric Co., Ltd., Tokyo, Japan

[21] Appl. No.: 920,410

[22] Filed: Jul. 27, 1992

[30] Foreign Application Priority Data

Aug. 8, 1991 [JP] Japan .................................. 3-199642

[51] Int. Cl.[5] ........................ G02F 1/133; G09G 3/36

[52] U.S. Cl. ...................................... 359/85; 358/241; 345/98; 345/208

[58] Field of Search ..................... 359/84, 85; 340/782, 340/784, 789, 805, 814; 358/213.11, 241

[56] References Cited

U.S. PATENT DOCUMENTS 4,748,515 5/1988 Umezawa ............................ 340/784
4,845,482 7/1989 Howard et al. ...................... 340/784

FOREIGN PATENT DOCUMENTS 0216188 4/1987 European Pat. Off. .............. 359/85
60-134218A 7/1985 Japan .
2-19083A 1/1990 Japan .

*Primary Examiner*—William L. Sikes
*Assistant Examiner*—Huy K. Mai
*Attorney, Agent, or Firm*—Guy W. Shoup; Patrick T. Bever; David W. Heid

[57] ABSTRACT

A circuit for driving a liquid crystal panel includes an A/D converter for converting image data to digital data, a shift register for generating horizontal scanning signals, a capacitor group formed of capacitors the number of which corresponds to the number of bits of digital data, a selector for selecting none or at least one capacitor from among the capacitor group on the basis of horizontal scanning signals and digital data, a power-supply section for supplying an electric charge to each capacitor, first switch sections for charging an electric charge to selected capacitors only in every horizontal synchronization period, and second switch sections for connecting all capacitors to their corresponding signal electrodes S in every horizontal synchronization period. Even if the liquid crystal panel is formed into a large screen, neither is its parts mounting surface increased considerably, nor do the costs increase. In addition, a display having a high resolution can be realized with a simple construction.

1 Claim, 5 Drawing Sheets

CIRCUIT FOR DRIVING LIQUID CRYSTAL PANEL

BACKGROUND OF THE INVENTION

1. FIELD OF THE INVENTION

The present invention relates to a circuit for driving a liquid crystal panel which uses a dot-matrix display method for displays of pocket televisions, lap-top computers or the like.

2. DESCRIPTION OF THE RELATED ART

FIG. 4 is a block diagram illustrating the construction of a part of a conventional circuit for driving a liquid crystal panel. In this figure, reference numeral 1 denotes a liquid crystal panel which uses a dot-matrix display method in which thin film transistors (TFTs) are used in switching pixels. An equivalent circuit of the switching matrix section thereof is shown in FIG. 5. Reference numerals 2 denote liquid crystal elements provided in each of the pixels on the matrix intersection points of the scanning electrodes (gate lines $G_1, G_2, \ldots, G_m$) and signal electrodes (source lines $S_1, S_2, \ldots, S_n$). One end of each of the liquid crystal elements is connected to a common electrode terminal $T_{c1}$. Reference numerals 3 denote TFTs, each of which is provided in each pixel and employed as a switching element for driving a corresponding liquid crystal element 2. The gates thereof are connected to gate lines $G_1, G_2, \ldots, G_m$ for each line, and the sources thereof are connected to source lines $S_1, S_2, \ldots, S_n$ for each row. Reference numerals 4 denote capacitors for storing signal charges for one vertical synchronization period, each of which capacitors is provided in each pixel. One end of each of the capacitors is connected to the drain of its corresponding TFT 3, and the other end is connected to a common electrode terminal $T_{C2}$.

In FIG. 4, reference numeral 6 denotes an integrated circuit (IC) for driving the liquid crystal panel 1. In this driving IC 6, reference numeral 7 denotes a shift register for outputting a horizontal synchronization signal on the basis of which a signal electrode to which image data is input, is selected; reference numeral 8 denotes a sample hold circuit for sample-holding image data inputted on the basis of the horizontal synchronization signal outputted from the shift register 7; and reference numeral 9 denotes an amplifier for current-amplifying signals outputted in parallel form from the sample hold circuit 8. Signals outputted in parallel form from the amplifier 9 are input to the source lines $S_1, S_2, \ldots, S_n$.

With the construction described above, to display an image on the liquid crystal panel 1, gate lines $G_1, G_2, \ldots, G_m$ on the liquid crystal panel 1 are scanned in sequence by a linear sequence method in order to simultaneously turn on all TFTs 3 on one gate line G. In synchronization with this scanning, a signal charge is supplied via source lines $S_1, S_2, \ldots, S_n$ from the driving IC 6 to a capacitor 4 corresponding to a pixel to be displayed from among capacitors 4 connected to the drains of the turned-on TFTs 3. This signal charge continues to excite the liquid crystal element 2 of the corresponding pixel until the next scanning is performed. As a result of repeating the operations explained above, a desired image is displayed on the liquid crystal panel 1.

In a case where the liquid crystal panel 1 is used as a display of a pocket television or the like, a voltage for driving the liquid crystal panel 1 is an analog voltage since video signals are handled. However, when the liquid crystal panel 1 is driven by an analog voltage, there is a limitation on the scanning speed. Accordingly, as described above, the driving IC 6 must be formed of a number of functional elements, such as the shift register 7, the sample hold circuit 8, or the amplifier 9. As a result, as the liquid crystal panel 1 becomes larger, so does the driving IC 6. A drawback is that the surface for mounting parts becomes large, and the costs are increased.

To realize a high-resolution or large-screen display by using the liquid crystal panel 1, high response to high-frequency signals is required. However, because the analog amplifier 9 is used, there is the problem that a limitation is imposed on the liquid crystal panel 1 due to the operating frequency of the signals.

The present invention has been accomplished in light of the above-described circumstances. An object of the present invention is to provide a circuit for driving a liquid crystal panel in which even if the liquid crystal panel is formed into a large screen capable of realizing a high resolution display with a simple construction, there is no appreciable increase of either the mounting surface for the parts or the cost of production.

To this end, according to the present invention, there is provided a circuit for driving a liquid crystal panel in which a plurality of scanning electrodes and a plurality of signal electrodes which cross the plurality of scanning electrodes are provided, by sequentially scanning the plurality of scanning electrodes and supplying image data to the plurality of signal electrodes, the circuit comprising: a conversion section for converting image data to digital data binarized according to the gradation of the image data; a horizontal scanning signal generation section for generating horizontal scanning signals used to select a signal electrode to which the digital data is input; capacitor groups, each of which capacitor groups being formed of capacitors the number of which corresponds to the number of bits of the digital data; selection sections, provided in correspondence with the plurality of signal electrodes, for selecting none or at least one capacitor from among the capacitor group on the basis of the horizontal scanning signals and the digital data; a power-supply section for supplying an electric charge to each of the capacitor group; first switch sections, provided in correspondence with the plurality of signal electrodes, for charging selected capacitors only by the selection sections of the capacitor group in every horizontal synchronization period; and second switch sections, provided in correspondence with the plurality of signal electrodes, for connecting all capacitors of the capacitor group, including capacitors which are not selected by the selection sections, to corresponding signal electrodes and supplying the electric charge which has been charged to the signal electrodes, in every horizontal synchronization period.

With the above-described construction, to display an image on a liquid crystal panel, a plurality of scanning electrodes are scanned in sequence, and the operation set forth below is performed when image data is supplied to a plurality of signal electrodes.

First, image data is converted by the conversion section into digital data binarized according to the gradation of the image data. Next, a signal electrode to which the digital data is input, is selected on the basis of the horizontal scanning signals generated by the horizontal scanning signal generation section. Then, none or at least one capacitor is selected by the selection sections from among the capacitor groups on the basis of the horizontal scanning signal and the digital data. As a result, the first switch sections charge capacitors of the capacitor group only selected by the selection sections in every horizontal synchronization period. The second switch sections connect all capacitors of the capacitor groups, including capacitors which are not selected by the selection sections, to corresponding signal electrodes and supply the electric charge which has been charged to the signal electrodes, in every horizontal synchronization period. A desired image is displayed on the liquid crystal panel by repeating the above-described operations.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

An embodiment of the present invention will be explained below with reference to the accompanying drawings.

Figure 1:
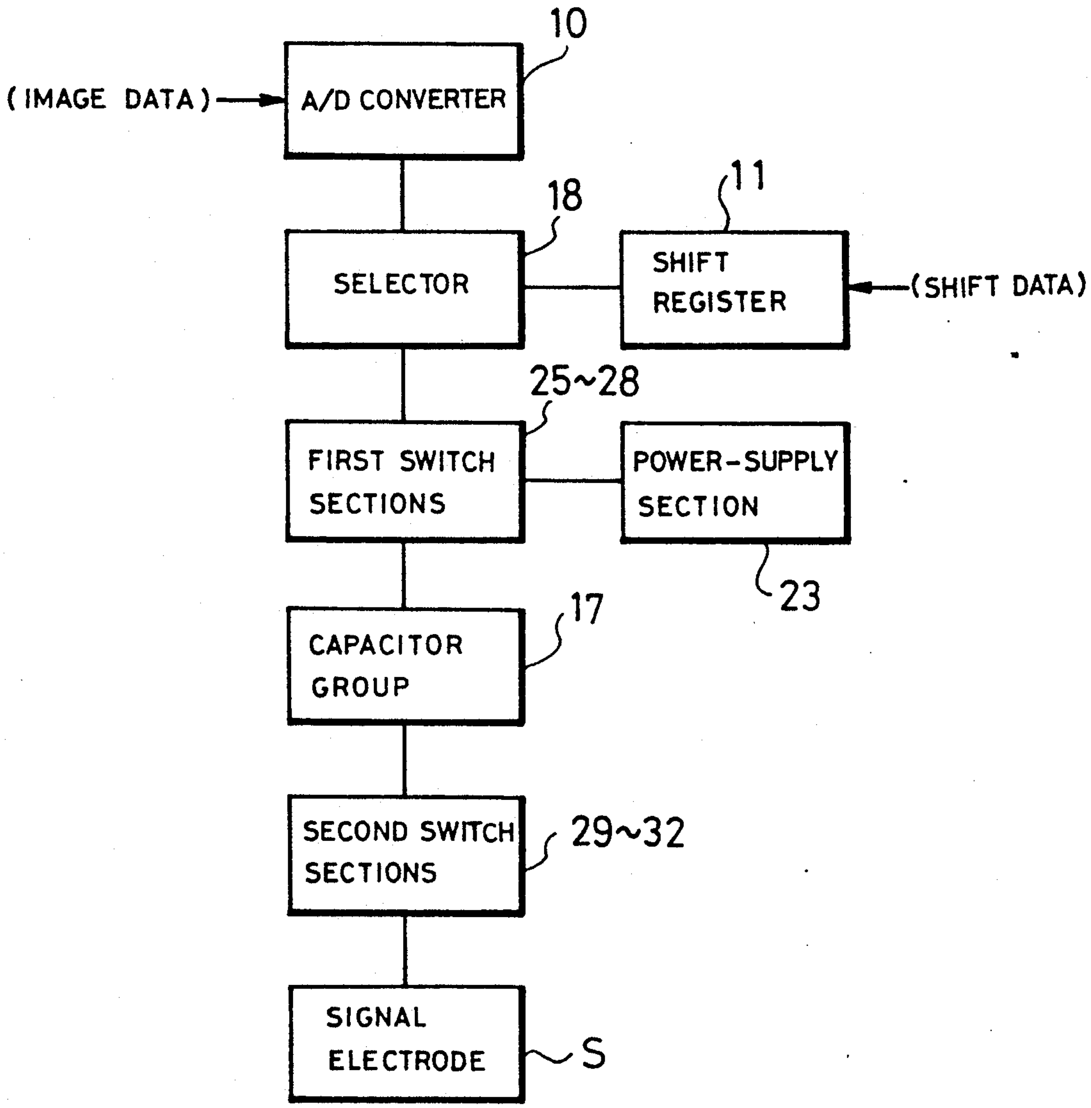
FIG. 1 is a block diagram of an embodiment of the present invention.
Figure 2:
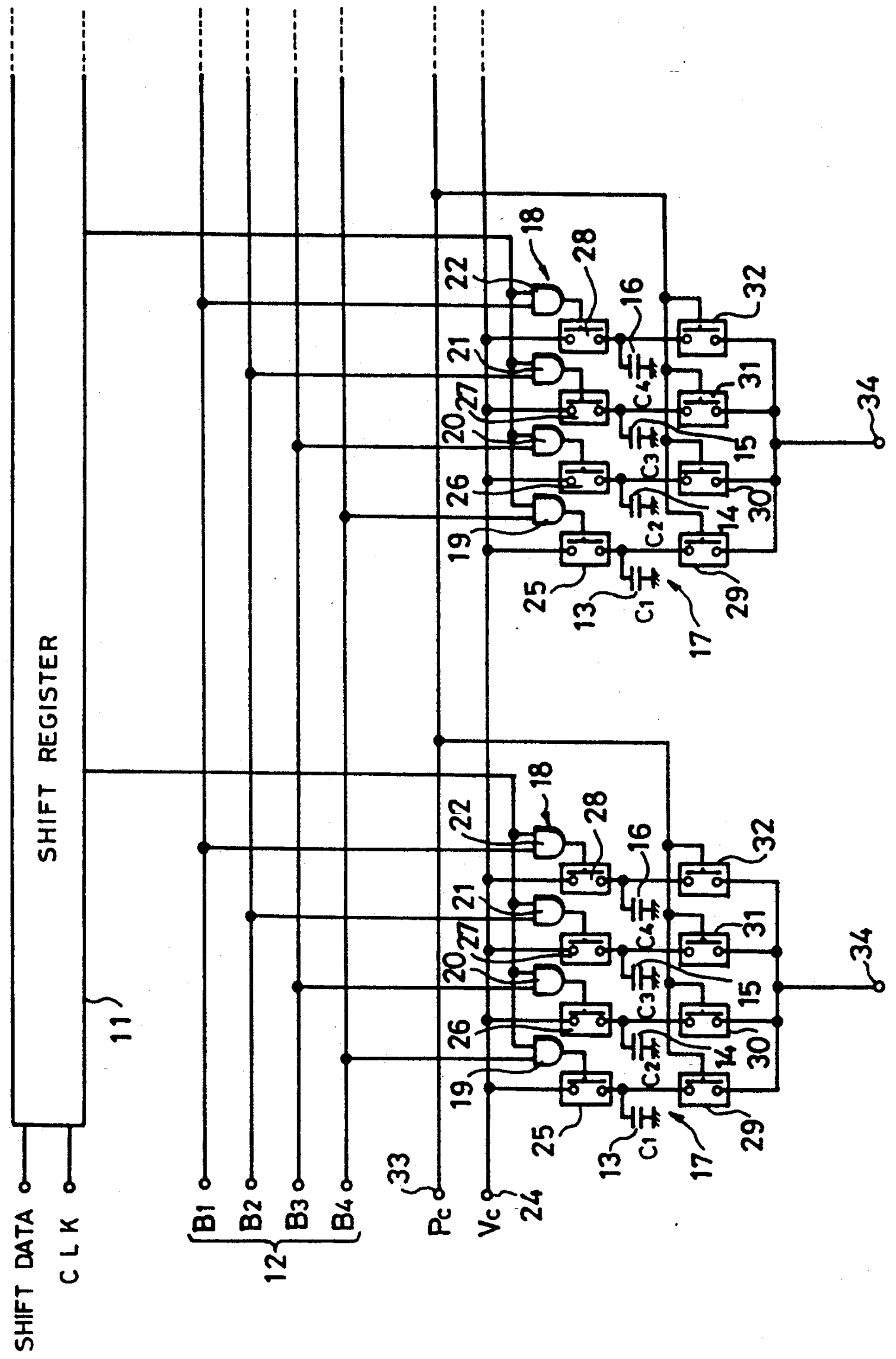
FIG. 2 is a partial circuit diagram of the embodiment shown in FIG. 1.

FIG. 1 is a block diagram illustrating the construction of a circuit for driving a liquid crystal panel according to an embodiment of the present invention. FIG. 2 is a circuit diagram illustrating the construction of a part of the circuit for driving a liquid crystal panel according to the embodiment of the present invention. In these figures, reference numeral 10 denotes an A/D converter for converting image data to digital data $B_1$to $B_4$ which are binarized according to the gradation of the image data; reference numeral 11 denotes a shift register (a horizontal scanning signal generation section) for generating horizontal scanning signals used to sequentially select a signal electrodes to which digital data $B_1$ to $B_4$ are input when shift data is input; and reference numeral 12 denotes a gradation control bus to which digital data $B_1$ to $B_4$ outputted from the A/D converter 10 are supplied.

Reference numerals 13 to 16 denote capacitors having capacities $C_1$ to $C_4$ ($C_1 : C_2 : C_3 : C_4 = 1 : 2 : 4 : 8$), respectively. These capacitors 13 to 16 constitute a capacitor group 17. The respective capacities $C_1$ to $C_4$ of the capacitors 13 to 16 are set at values sufficiently larger than the capacity CP of the liquid crystal element 2. Reference numeral 18 denotes a selector (a selection section) for selecting none or at least one capacitor from among the capacitors 13 to 16 on the basis of digital data $B_1$ to $B_4$ outputted from the A/D converter 10, the selector being formed of AND gates 19 to 22. Reference numeral 23 denotes a power-supply section for supplying a charge voltage $V_c$ to the capacitors 13 to 16 via a charge voltage applying terminal 24.

Reference numerals 25 to 28 denote first switch sections for charging capacitors only selected by the selector 18 of the capacitor group 17 in every horizontal synchronization period. Reference numerals 29 to 32 denote second switch sections for connecting all the capacitors of the capacitor group 17, including capacitors which are not selected by the selector 18, to corresponding signal electrodes, on the basis of the charge pulse $P_C$ outputted from an unillustrated control circuit in every horizontal synchronization period and inputted via a charge pulse input terminal 33, and for supplying the electric charge which has been charged to the signal electrodes. Reference numeral 34 denotes output terminals through which an electric charge which has been stored in each capacitor of the capacitor group 17 is supplied to corresponding signal electrodes.

Figure 5:
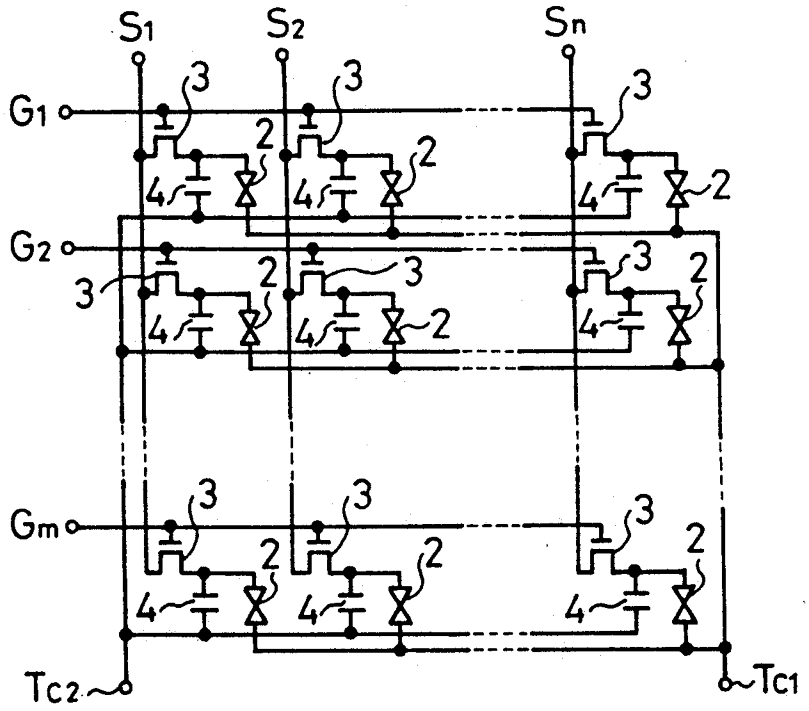
FIG. 5 is a circuit diagram illustrating an equivalent circuit of a switch matrix section of the liquid crystal panel 1.

The circuit components 13 to 22, 25 to 32, and 34 are provided in each of the source lines S of the liquid crystal panel 1 shown in FIG. 5. The output terminal 34 is connected to one of the source lines S of the liquid crystal panel 1. The circuit components other than the shift register 11 are formed by the same process as above on a glass board on which all of the circuit components of liquid crystal panel 1 shown in FIG. 5 are formed. Of course, a part or all of the circuit components may be formed into ICs.

With the construction described above, to display an image on the liquid crystal panel 1, first, image data is converted by the A/D converter 10 into binarized digital data $B_1$ to $B_4$ according to the gradation of the image data. Next, horizontal scanning signals for sequentially specifying a source line S to which digital data $B_1$ to $B_4$ outputted from the shift register 11 are input, and digital data $B_1$ to $B_4$ outputted from the A/D converter 10 via the gradation control bus 12, are input to the selector 18.

Thereupon, none or at least one of the first switch sections 25 to 28 are turned on in accordance with the output signal of the shift register 11 and the digital data $B_1$ to $B_4$. In response to this, selected capacitors of the capacitors 13 to 16 are charged until the electrical potentials thereof reach the same electrical potential as the charge voltage $V_C$. The charge amounts $Q_1$ to $Q_4$ charged in each respective capacitor 13 to 16 are the product of the charge voltage $V_C$ and the capacities $C_1$ to $C_4$ of respective capacitors. The total amount Q of the electric charges which are charged in all the capacitors 13 to 16 may have 16 different values depending upon the digital data $B_1$ to $B_4$. That is, a charge amount proportional to 16 gradations is charged in the capacitors 13 to 16.

When the charge pulse Pc which becomes active in every horizontal synchronization period is input to the second switch sections 29 to 32 via the charge pulse input terminal 33 after all of the the first switch sections 25 to 28 are turned off, the charge pulse Pc causes all the second switch sections 29 to 32 to be turned on, causing the output terminal 34 to be connected to all the capacitors 13 to 16.

Figure 3:
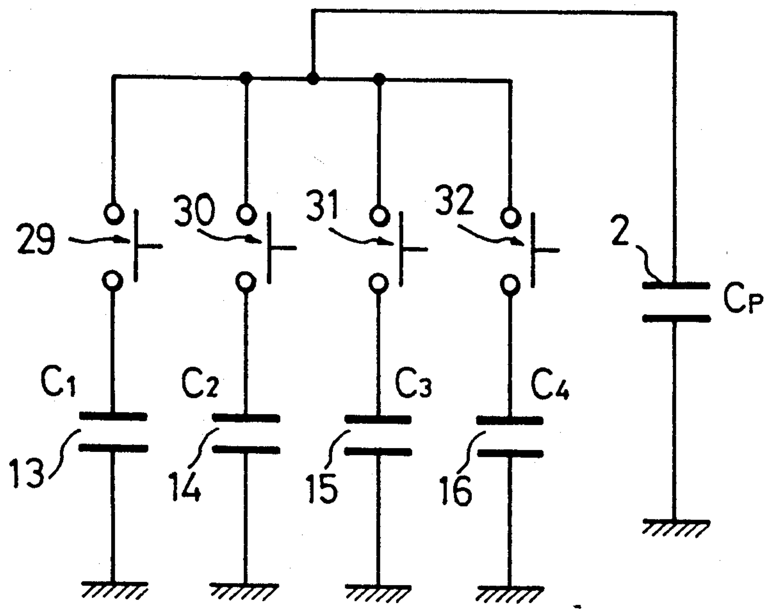
FIG. 3 is an equivalent circuit illustrating a part of the circuit shown in FIG. 2.
Figure 4:
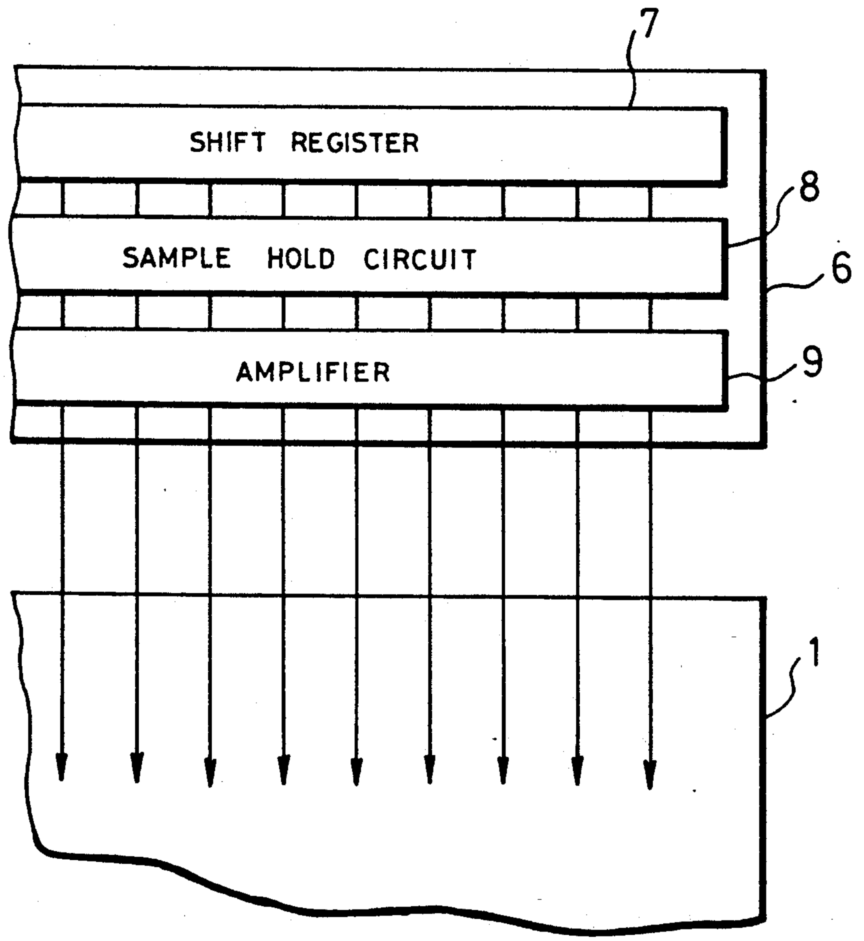
Fig. 4 PRIOR ART
FIG. 4 is a block diagram illustrating the construction of a part of a conventional circuit for driving a liquid crystal panel.

FIG. 3 shows an equivalent circuit diagram of the capacitors 13 to 16, the second switch sections 29 to 32 and the liquid crystal panel 1 in one of the matrix intersection points of FIG. 7. As can be seen in this figure, capacitors which are charged according to the digital data $B_1$ to $B_4$ and capacitors which are not charged are all connected parallel to each other. Thus, a combined capacity $C_O$ ($=C_1+C_2+C_2+C_4$) is formed. As described above, since the total amount Q of the electric charges which are charged in all the capacitors 13 to 16 have 16 different values, when all the first switch sections 25 to 28 are turned off and the second switch sections 29 to 32 are turned on, 16 different electrical potentials V' corresponding to 16 gradations are developed across the output terminal 34 by the following equation:

$$Q=C_O V' \quad (1)$$

That is, since the electrical potentials V' supplied to the liquid crystal elements 2 are changed by changing the total amount Q of the electric charges which are charged, gradation control can be performed. Thus, a desired image can be displayed on the liquid crystal panel 1 by sequentially repeating the operations described above.

The ratio of the capacities $C_1$ to $C_4$ of the capacitors 13 to 16 is not limited to the above-mentioned ratio 1:2:4:8, but may be set appropriately in accordance with the voltage-transmittance characteristics of a liquid crystal material used for the liquid crystal panel 1. As a result, a voltage V' is developed across the output terminal 34.

The number of gradations can be increased by increasing the number of the capacitors 13 to 16. Before an electric charge according to new image data is charged, the capacitors 13 to 16 cause the output of the shift register 11 to be active and all the digital data $B_1$ to $B_4$ to be active. As a consequence, the first switch sections 25 to 28 are turned on, and the charge voltage $V_C$ is set to a zero electrical potential at that time, causing the capacitors 13 to 16 to be set to a non-charged condition. Of course, this operation may be performed easily by a circuit element separately provided.

In addition, the influence of the charge amount of the liquid crystal element 2 before it is charged can be ignored because of the fact that the capacity $C_P$ of the liquid crystal element 2 is smaller than the combined capacity C' and, with respect to video signals, the correlation of the positions between frames is large.

As has been explained above, since most of the functions which have been previously incorporated into the driving IC 6 are formed on the glass board of the liquid crystal panel 1, the costs and the mounting surface can be reduced.

In addition, digital control is made possible because gradation control by a single power source is performed by using the capacitors 13 to 16. Therefore, since there is no need to drive by high-frequency signals as in the driving by an analog voltage in the prior art, the construction of the outer circuit of the liquid crystal panel 1 can be simplified, and high-speed processing is made possible. A large-screen and high resolution display can be realized. For example, although a screen of 800×1,200 dots is an upper limit in the prior art, a screen having a high resolution twice that of the prior art can be realized according to this embodiment.

Although in the prior art, signals are distorted due to transistors or resistors when analog signals are used, the distortion of signals is reduced according to this embodiment.

According to the present invention, as described above, even if the liquid crystal panel is formed into a large screen, neither is the surface for mounting parts increased considerably, nor are the costs. In addition, there is the advantage that a display having a high resolution can be realized with a simple construction.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included with the spirit and scope of the claims. The following claims are to be accorded a broad interpretation, so as to encompass all such modifications and equivalent structures and functions.

What is claimed is:

1. A circuit for driving a liquid crystal panel in which a plurality of scanning electrodes and a plurality of signal electrodes which cross the plurality of scanning electrodes are provided, by sequentially scanning the plurality of scanning electrodes and supplying image data to the plurality of signal electrodes, said circuit comprising:

a conversion section for converting image data to digital data binarized according to the gradation of the image data;

a horizontal scanning signal generation section for generating horizontal scanning signals used to select a signal electrode to which the digital data is input;

capacitor groups, each of which capacitor groups being formed of capacitors the number of which corresponds to the number of bits of the digital data;

selection sections, provided in correspondence with the plurality of signal electrodes, for selecting none or at least one capacitor from among the capacitor group on the basis of the horizontal scanning signals and the digital data;

a power-supply section for supplying an electric charge to each of the capacitor group;

first switch sections, provided in correspondence with the plurality of signal electrodes, for charging selected capacitors only by the selection sections of the capacitor group in every horizontal synchronization period; and second switch sections, provided in correspondence with the plurality of signal electrodes, for connecting all capacitors of the capacitor group, including capacitors which are not selected by the selection sections, to corresponding signal electrodes and supplying the electric charge which has been charged to the signal electrodes, in every horizontal synchronization period.

* * * * *